3,193,343
COMPOSITION HAVING THE FORMULA $P_2NSCl_5$ AND PROCESS FOR PREPARING SAME
Margot Becke, Heidelberg, Germany, assignor to Olin Mathieson Chemical Corporation, a corporation of Virginia
No Drawing. Filed July 11, 1962, Ser. No. 209,247
4 Claims. (Cl. 23—14)

This invention relates to a novel composition and method for preparing it. The novel composition has the empirical formula $P_2NSCl_5$. It is believed to have the structural formula $Cl_3P:NP(S)Cl_2$. The novel process of preparing the compound comprises reacting an excess of hydrogen sulfide or a mixture of sulfur and sulfur monochloride on the compound $P_3NCl_{12}$. The $P_3NCl_{12}$ is prepared in known manner from ammonium chloride and $PCl_5$ in nitobenzene at 45 to 60° C. as described, for example, by M. Becke-Goehring, Z. angew. Chem., 73, 246 (1961).

Without solvent, $P_3NCl_{12}$ reacts at substantially room temperature and pressure with gaseous hydrogen sulfide to form $P_2NSCl_5$, $PSCl_3$ and HCl. The mixture gradually liquefies. It is fractionated under reduced pressure to remove by-products and is finally vacuum distilled.

The reaction of $P_3NCl_{12}$ with sulfur is conveniently carried out by dissolving the $P_3NCl_{12}$ in an inert liquid, for example, tetrachloroethane, nitrobenzene, nitromethane, sulfur monochloride or acetonitrile and suspending sulfur therein. A small amount of sulfur monochloride is added except when it is the selected reaction medium. The sulfur monochloride appears to activate the sulfur which does not react in the absence of a suitable activating agent. The reaction proceeds at room temperature but is advantageously accelerated by warming to 150 to 160° C. The mixture is vacuum fractionated to recover the product.

The reactions involved are represented by the following equations:

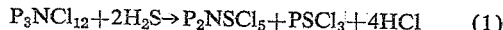
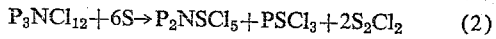

$$P_3NCl_{12} + 2H_2S \rightarrow P_2NSCl_5 + PSCl_3 + 4HCl \qquad (1)$$
$$P_3NCl_{12} + 6S \rightarrow P_2NSCl_5 + PSCl_3 + 2S_2Cl_2 \qquad (2)$$

In either case at least the stoichiometric ratio of the sulfurous reagent required by the above equations is used. Excess does no harm.

The new compound is a liquid above its melting point of 37° C. and boils at 138° C. at 14 millimeters and 103–105° C. at 0.5 millimeter and 76–78° C. at 0.01 millimeter. It is readily soluble in benzene, chloroform, tetrachloroethane, carbon tetrachloride and nitrobenzene. It is slightly soluble in cold petroleum ether but readily soluble in hot petroleum ether. The $P_2NSCl_5$ compound of this invention is an acid chloride very susceptible to hydrolysis. However, the nitrogen-phosphorus bonds are both very resistant to hydrolysis. The compound reacts readily with dimethylamine to form the compound $R_3P:NP(S)R_2$ where the R's are dimethylamino groups. This is an active insecticide.

Example I

A stream of dry hydrogen sulfide was passed over 53.2 grams of $P_3NCl_{12}$ without significant heating or cooling. The crystals of $P_3NCl_{12}$ gradually liquefy. When they are completely dissolved, the liquid is fractionated under reduced pressure removing first the byproduct thiophosphoryl chloride and then the new compound. The yield was 24.5 grams or 86 percent of theory.

Example II

To a solution of 53.2 grams of $P_3NCl_{12}$ in 150 grams of tetrachloroethane was added 20 grams of sulfur. With stirring, 10 milliliters of sulfur monochloride were added and the mixture was warmed until it was homogeneous. On cooling about 9.9 grams of sulfur separated and this was removed by filtration. The filtrate was distilled in a vacuum to remove the tetrachloroethane and the residue was extracted with cold benzene. The benzene was removed by distillation and the residue was vacuum distilled. A yield of 15.5 grams or 54 percent of the theory of pure $P_2NSCl_5$ was obtained.

Analysis for $P_2NSCl_5$: Found: Cl, 61.8%, 61.4%; P, 21.35%; S, 11.7%, 11.5%; N, 4.92%, 4.95%.

The molecular weight determined cryoscopically in benzene was found to be 284 and 289 compared with a theoretical value of 286.

What is claimed is:
1. A composition of matter having the formula $P_2NSCl_5$.
2. Method of preparing the compound of claim 1 which comprises reacting $P_3NCl_{12}$ with a sulfurous material selected from the group consisting of hydrogen sulfide and a mixture of sulfur with sulfur monochloride and recovering the product from the reaction mixture.
3. Process of claim 2 in which the reaction is carried out in the presence of an inert liquid reaction medium.
4. Process of claim 3 in which the inert reaction medium is symmetrical tetrachloroethane.

References Cited by the Examiner
UNITED STATES PATENTS
2,575,317  11/51  Jonas et al. _____ 23—14
FOREIGN PATENTS
572,951  3/59  Canada.
OTHER REFERENCES
M. Becke-Goehring, Z. angew. Chem., 73, 246 (Apr. 7, 1961).

MAURICE A. BRINDISI, *Primary Examiner.*